E. GREENE.

BOTTLE.

APPLICATION FILED JULY 30, 1917.

Reissued Oct. 23, 1917. 14,382.

INVENTOR

Edgeworth Greene,

BY

Thos. H. Dennison

ATTORNEY

UNITED STATES PATENT OFFICE.

EDGEWORTH GREENE, OF UPPER MONTCLAIR, NEW JERSEY.

BOTTLE.

14,382. Specification of Reissued Letters Patent. Reissued Oct. 23, 1917.

Original No. 1,211,934, dated January 9, 1917, Serial No. 840,401, filed May 23, 1914. Application for reissue filed July 30, 1917. Serial No. 183,622.

*To all whom it may concern:*

Be it known that I, EDGEWORTH GREENE, a citizen of the United States, residing at Upper Montclair, in the county of Essex and State of New Jersey, have invented certain new and useful Improvements in Bottles, of which the following is a specification.

This invention relates to a so-called non-refillable bottle, and its novelty resides in the construction and adaptation of the parts and in the application of the principles upon which the invention is based.

Many attempts have been made to make non-refillable bottles, and many would seem to have resulted in the production of bottles which when once emptied could not be refilled by merely pouring a liquid back through the mouth of the bottle into the body or reservoir thereof. Yet, until the present invention, so far as such bottles are known to me, none was proof against methods of refilling which involved the immersion of the mouth of an empty bottle in a liquid attempted to be introduced therethrough and the creation of a pressure upon the surface of the liquid greater than the pressure inside the bottle. The bottle of my invention, a practical and convenient embodiment of which is now about to be described, cannot be refilled by any such method, nor indeed by any method known to me, and its function in this respect, to the best of my information and belief, depends most largely upon the fact that the closing device comprises separate members both of greater and lesser specific gravity than the liquid contents of the bottle and one of which constitutes a valve, said members being so arranged relatively to each other that said valve is closed through forces of buoyancy when said bottle is tilted beyond a horizontal position and said valve chamber is filled with a liquid, and closed by action of gravity when said bottle is in all other positions, and being also opened by action of gravity when the filled or partially filled bottle is inverted and air enters the dispensing orifice to prevent submergence and the consequent creation of forces of buoyancy.

Figure 1:
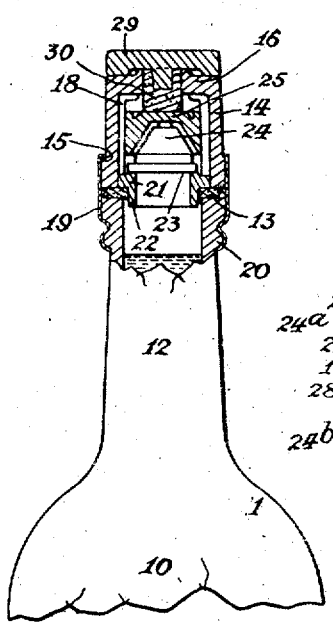
Figure 2:
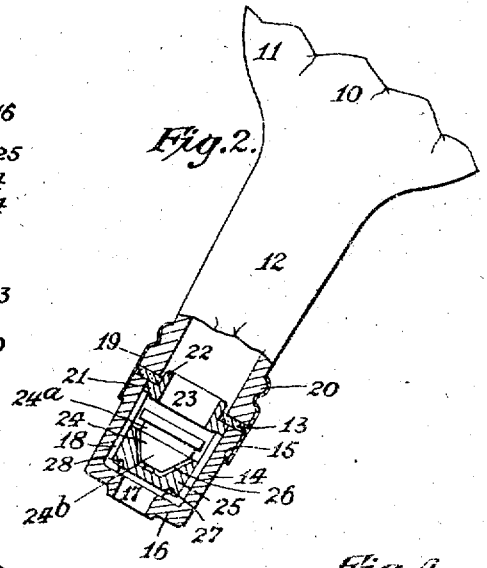
Figure 4:
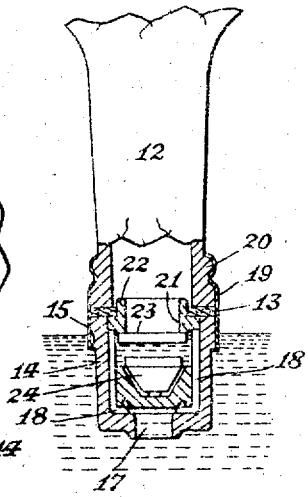
Figure 3:
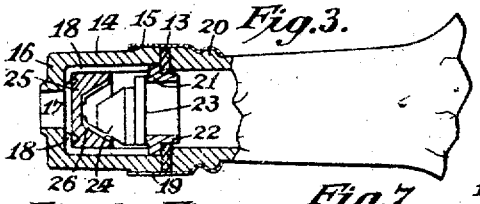
Figure 5:
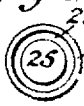
Figure 6:
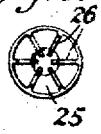
Figure 7:
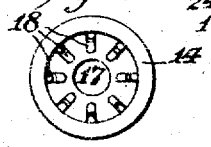

In the drawings, Figure 1 is a longitudinal central sectional elevation of the upper part of a bottle equipped with a device embodying my invention, the parts being in the positions assumed when the bottle is in an upright position, and otherwise when it is sealed, as shown in this figure and as hereinafter described; Fig. 2 is a similar view showing the positions of the parts when the bottle is at least partially inverted to pour out its contents; Fig. 3 is a similar view showing the positions of the parts when the bottle is placed on its side, or horizontally disposed, these positions being the same irrespective of the amount of liquid in the bottle; Fig. 4 is a similar view illustrating what occurs when the bottle is inverted and the mouth thereof immersed in a liquid in an attempt to refill by pressure; Fig. 5 is a top plan view of what I shall hereinafter refer to as the guard and guide; Fig. 6 is a bottom plan view thereof, and Fig. 7 is a bottom plan view of the terminal shell or casing.

In these drawings, numeral 10 represents the body of a bottle of which 11 is the shoulder and 12 is the neck. I have shown placed upon the upper edge of the neck 12 an annular gasket or packing ring 13, made of cork or other suitable packing material, and placed above this is the cylindriform shell or casing 14 which is provided with an external shoulder 15 and terminates in a transverse disk or top 16 having a central orifice 17. The shell 14 is open at the bottom, and is secured to the neck of the bottle at the mouth thereof preferably by a retaining band 19 of metal spun onto the neck of the bottle over the usual bead 20 and around and above the shoulder 15 on said shell. This shell 14 is also provided interiorly with a series of longitudinal ribs 18 which are continued under the disk or top 16.

Mounted above the gasket or packing ring 13 and fitting snugly within the open end of the shell 14 is a seat 21 in the form of a ring made of porcelain or other suitable material, which I have shown provided with a depending flange 22 passing downwardly inside of the gasket 13. Loose within the shell 14, above this seating ring and adapted to rest thereon by gravity, is the preferably disk-shaped body 23, of cork or other suitable buoyant material, which constitutes a valve for opening and closing the passage through the seating ring 21. Above the valve or float 23 is loosely placed a weight 24, of porcelain or other material heavier than the liquid to be placed in the bottle.

The valve or float 23 moves freely between the ribs 18 of the shell 14 and the weight 24 rests upon it by gravity when the bottle is in an upright position. The weight 24 is preferably cylindro-conical in form—that is to say, includes a lower cylindrical portion $24^a$ and an upper frusto-conical portion $24^b$.

While, as hereinbefore suggested, it is doubtless impossible to definitely determine all of the causes of what takes place within the shell 14 under various conditions, I consider it most important that the contiguous faces of the weight 24 and the float or valve 23 should be of such character that these members shall adhere under air pressure when wet and brought into contact with each other. With the same qualifications, I also consider it important that if the material of which the ring 21 is composed is such that it also will have a tendency to adhere to the valve 23 when contiguous faces thereof are wet, then the area of contact surface between weight and valve should be decidedly greater than the contact area between valve and ring, so that the weight in falling under action of gravity will carry with it the valve or float under forces sufficient to overcome the "suction" between valve and seat.

Arranged within the shell 14 above the weight 24, I have shown a combined guard and guide 25 which is cylindrical in external form. This guard and guide member 25 is provided with a frusto-conical recess in the lower face thereof, corresponding in contour to the upper portion $24^b$ of the weight 24, whereby the latter may be received within and contained by the former, a series of ribs 26 being provided on the wall of the recess to prevent air-pressure adherence between weight and guard when wet. I have also shown the guard and guide 25 provided on its upper face with an annular groove 27, leaving what may be termed an annular wall 28 at its outer edge, for a purpose which will be hereinafter set forth. The valve 23 may be retained in a closed condition by means of a stopper 29 having an inwardly projecting plug 30, preferably of cork or like material, adapted to fit snugly within the orifice 17 in the top of the shell 14. This plug 30, when the stopper is in place, presses down upon the guard and guide 25, and the latter, in turn, upon the weight and valve, and consequently tends to seal the bottle for shipment and initial handling or whenever it is desired to prevent egress of the liquid contents of the bottle when wholly or partially inverted.

In use, the bottle—without the equipment or fitment shown and described—is first filled with the desired liquid. The shell 14, with its contained parts properly assembled therein, is then positioned at the mouth of the bottle, through the interposition of the gasket 13, and secured to the bottle-neck by the retaining band 19 in the manner described. The stopper 30 may then be inserted in the orifice 17 to prevent premature or other untimely dispensation of the contents of the bottle. When it is desired to dispense a portion or all of said contents, the stopper 30, if in place, is removed and the bottle is inverted, or tipped to a position of inclination substantially as shown in Fig. 2. The contained liquid now presses upon the normally lower—but in this position upper—side of the cork or float valve 23, undoubtedly to an extent sufficient to at least momentarily unseat the valve and wet the contiguous faces of weight and valve. Before any appreciable degree of partial vacuum can be established in the bottle, the now wet weight and valve are pressed together, and as the liquid flows from the valve chamber as rapidly as it enters the same the air pressure will cause adherence between these parts and the weight will hold the valve off its seat, the clearance area being sufficient to permit the free flow of air around said valve and into the bottle to replace the liquid drawn therefrom. It may be that the valve-controlling forces of gravity applied to the valve through the adhering weight are to a greater or lesser extent augmented by the weight and impact of the outflowing liquid, but under any circumstances the valve will be retained in an open condition and liquid will flow freely from the bottle. If the bottle is partly emptied and then returned to an upright position, the weight 24 will fall by gravity upon the valve 23 and cause the latter to rest upon the seat 21 to close the opening into the bottle. If the bottle is placed on its side, in the position shown in Fig. 3, the same result will take place because of the coöperating sloping sides of the weight 24 and the guard and guide 25, as the weight will always slide to a lowermost position and in such position will push the valve 23 against the seating ring 21 and effectually close the mouth of the bottle. If the bottle is completely emptied and its mouth is submerged in a body of liquid, as shown in Fig. 4, the guard and guide 25 and the weight 24 will both drop to the positions indicated in that figure, both being heavier than liquid now being attempted to introduce, but as the chamber within the shell 14 fills any air-pressure adherence between weight and valve will be broken by immersion and the valve will be floated and be seated against the ring 21 to close the opening therethrough before any liquid can have entered the bottle. No matter how much pressure be put upon the surface of the liquid outside of the bottle to force the liquid upward into the bottle, the greater the pressure the tighter will be the closure.

The wall 28 of the guard and guide 25 and the annular groove 27 inside of said wall constitute what may be termed a baffling device to prevent the introduction of a wire or tool through the opening 17 of the shell 14 and down into the shell between the ribs 18 to possibly engage the weight 24 or the valve 23 and hold the valve off its seat or effect its withdrawal therefrom, in this manner permitting the introduction from above of liquid into the body of the bottle. While the possibility of an attempt to manipulate the valve in this manner may be remote, this particular device has been provided to prevent it, which it does, because when such use of a wire or the like is attempted, the end of the wire is caught in the groove 27 and against the wall 28 and it cannot be further forced downward into the shell.

What I claim is:

1. A non-refillable bottle comprising a reservoir provided with a separate valve compartment having a discharge orifice, a valve-seat intermediate the orifice and the reservoir, a float constituting a valve, weighted means separate from the float and retained against escape from said valve compartment adapted and arranged to move the float in a direction away from the seat when the bottle containing the liquid is tilted from an upright to a pouring position and to move the float, in response to gravity, in a direction toward the seat when the bottle is returned from a pouring to or beyond a horizontal position, and when refilling with liquid is attempted while the bottle is in an inverted position communication through said seat is closed by the movement of said float, due to its buoyancy, in a direction toward said seat, and means for preventing air-pressure adherence between said weighted means and any adjacent surface of any element of the bottle sufficient to prevent the closing of the valve when refilling with liquid is attempted.

2. A non-refillable bottle comprising a reservoir provided with a separate valve compartment having a discharge orifice, a valve-seat intermediate the orifice and the reservoir, a float constituting a valve, weighted means separate from the float and retained against escape from said valve compartment adapted and arranged to move the float in a direction away from the seat when the bottle containing the liquid is tilted from an upright to a pouring position, and to move the float, in response to gravity, in a direction toward the seat when the bottle is returned from a pouring to or beyond a horizontal position, the relative contour of adjacent surfaces of said weighted means and any element of the bottle being such that any air-pressure adherence therebetween is insufficient to prevent the closing of the valve when refilling of the bottle with liquid is attempted.

3. A non-refillabe bottle comprising a reservoir, and adjacent separate valve compartment having a discharge orifice, a valve-seat intermediate the orifice and the reservoir, means, including a float and weighted means retained within said valve compartment, for opening and closing communication through said valve-seat, said weighted means including a weight movable with respect to the float and so dimensioned as to have freedom of longitudinal movement within said compartment under all conditions, that part of said opening and closing means adjacent to the valve-seat and including the float constituting a float-valve, and the arrangement of the members of said opening and closing means being such that when the bottle containing liquid is tilted from an upright to a pouring position communication through said valve-seat is opened by the movement in response to gravity of an element of said opening and closing means which in turn effects movement of the float in a direction away from the seat, and when the bottle is returned from a pouring to and beyond a horizontal position communication through said seat is closed by the movement in response to gravity of an element of said opening and closing means which in turn effects movement of the float in a direction toward said valve-seat, and when refilling with liquid is attempted while the bottle is in an inverted position communication through said seat is closed by the movement of said float in response to buoyancy in a direction toward said seat, and further means for preventing air-pressure adherence between any surface of the weighted means and an element of the bottle adjacent thereto sufficient to interfere with the closing of communication through the valve-seat when refilling with liquid is attempted.

4. A non-refillable bottle comprising a reservoir, an adjacent separate valve compartment having a discharge orifice, a valve-seat intermediate the orifice and the reservoir, means, including a float and weighted means retained within said valve compartment, for opening and closing communication through said valve-seat, said weighted means including a weight movable with respect to the float and so dimensioned as to have freedom of longitudinal movement within said compartment under all conditions, that part of said opening and closing means adjacent to the valve-seat, and including the float constituting a float-valve, and the arrangement of the members of said opening and closing means being such that when the bottle containing liquid is tilted from an upright to a pouring position communication through said valve-seat is opened by the movement in response to gravity of an element of said opening and closing means which in turn effects movement of the float in a direction away from the seat, and when the bottle is returned from a pouring to or beyond a horizontal position communication through said seat is closed by the movement in response to gravity of an element of said opening and closing means which in turn effects movement of the float in a direction toward said valve-seat, the relative contour of adjacent surfaces of said weighted means and any element of said bottle being such that any air-pressure adherence therebetween is insufficient to prevent the closing of communication through the valve-seat when refilling with liquid is attempted.

5. An attachment for rendering a bottle non-refillable which includes a valve compartment having a discharge orifice at one end and a valve-seat at the other, and containing a guard member the interior surface of which is of frusto-conical configuration, and a coöperating slidable weight member having a corresponding frusto-conical configuration at one end and a cylindrical configuration at the other, the maximum diameter of said conical portion being equal to that of said cylindrical portion, and the configuration of the adjacent surfaces of said guard and said weight being such that the air-pressure adherence therebetween when wet will be insufficient to prevent the separation thereof under ordinary forces of gravity.

6. An attachment for rendering a bottle non-refillable which includes a valve compartment having a discharge orifice at one end and a valve-seat at the other, and containing a guard member the interior surface of which is of frusto-conical configuration, and a coöperating slidable weight member having a corresponding frusto-conical configuration at one end and a cylindrical configuration at the other, the maximum diameter of said conical portion being equal to that of said cylindrical portion, said cylindrical portion only of said weight member being adapted to project from said guard member when said weight member is in its innermost position with respect thereto, the configuration of adjacent surfaces of said weight and said guard being such that air-pressure adherence therebetween when wet will be insufficient to prevent the separation thereof under ordinary forces of gravity.

7. An attachment for rendering a bottle non-refillable which includes a valve compartment having a discharge orifice at one end and a valve-seat at the other, and containing a guard member the interior surface of which is of frusto-conical configuration, and a coöperating slidable weight member having a corresponding frusto-conical configuration at one end and a cylindrical configuration at the other, the weight member being so proportioned that when at its innermost position within said guard member its cylindrical portion only will project therefrom and its center of gravity will be in such a relative position as to render said weight member very sensitive to the influence of gravity in its tendency to move away from the guard member when the attachment is in a substantially horizontal position, and the configuration of the adjacent surfaces of said guard and said weight being such that air-pressure adherence therebetween when wet will be insufficient to prevent the separation thereof in response to gravity.

8. A non-refillable bottle comprising a casing adapted to be secured to the neck of a bottle and having a discharge orifice at one end and a valve-seat at the other, closing means comprising two parts, one of which is a cork disk-valve positioned next to said valve-seat and adapted to contact with said seat and the other of which is a weight member having a frusto-conical configuration at its end adjacent said orifice and of cylindrical configuration at its other end, the maximum diameter of said conical portion being no less than that of said cylindrical portion, a guide for said weight member having a frusto-conical recess into which said weight member is adapted to partially project, ribs interposed between said weight member and said guide to prevent air-pressure adherence therebetween, a baffle wall between said guide and said orifice, and a stopper for the casing adapted to hold the movable parts thereof stationary within the casing.

9. A non-refillable bottle comprising means for providing a valve chamber between the dispensing orifice and the body portion of the bottle, said means including an orificed valve-seat, a valve and valve-controlling means loose in said chamber, said valve being closed through forces of buoyancy when the bottle is tilted beyond a horizontal position and said valve chamber is filled with a liquid, and said valve being closed by action of gravity when said bottle is in all other positions and being also opened by action of gravity when the filled or partially filled bottle is inverted and air is permitted to enter through said dispensing orifice, said valve being free to move under action of one or the other of these two forces under all conditions, and means for minimizing air-pressure adherence between the gravity-actuated valve controlling means and the walls of the chamber containing the same.

10. A non-refillable bottle comprising means for providing a chamber between the dispensing orifice and the body portion of the bottle, said means including an orificed valve-seat, closing means which include disconnected parts at least one of which is of higher and at least one of which is of lower specific gravity than the liquid contents of the bottle and one of which constitutes a valve, said parts being so arranged relative to each other that said valve is closed through forces of buoyancy when the bottle is tilted below a horizontal position and said chamber is filled with liquid, closed by gravity when said bottle is in all other positions and opened by gravity when the filled or partially filled bottle is inverted and air is permitted to enter through said dispensing orifice, said valve being free to move under action of one or the other of these two forces under all conditions, and means for minimizing air-pressure adherence between any part of said closing means and contiguous walls of the chamber containing the same.

EDGEWORTH GREENE.

Witnesses:
ELSIE HARTUNG,
LORETTA F. DELANEY.